United States Patent
Lonardi et al.

(10) Patent No.: US 6,445,094 B1
(45) Date of Patent: Sep. 3, 2002

(54) HOISTING DRIVE FOR USE IN THE IRON AND STEEL INDUSTRY

(75) Inventors: Emile Lonardi, Bascharage (LU); Hans Bajohr, Wadern (DE); Charles Recher, Esch sur Alzette (LU)

(73) Assignee: Paul Wurth S.A. (LU)

( * ) Notice: Subject to any disclaimer, the term of this patent is extended or adjusted under 35 U.S.C. 154(b) by 0 days.

(21) Appl. No.: 09/673,127

(22) PCT Filed: Feb. 2, 1999

(86) PCT No.: PCT/EP99/00645
§ 371 (c)(1),
(2), (4) Date: Oct. 11, 2000

(87) PCT Pub. No.: WO99/46849
PCT Pub. Date: Sep. 16, 1999

(30) Foreign Application Priority Data

Mar. 11, 1998 (LU) .................................. 90222

(51) Int. Cl.$^7$ ............................ H02K 41/00; B66F 3/44
(52) U.S. Cl. ......................... 310/12; 254/362; 212/331
(58) Field of Search ........................... 310/12, 13, 14; 254/362; 212/331

(56) References Cited

U.S. PATENT DOCUMENTS

| 2,784,672 A | * | 3/1957 | Wallace | 310/54 |
| 4,691,131 A | | 9/1987 | Nakano | 310/54 |
| 4,839,545 A | | 6/1989 | Chitayat | 310/12 |
| 5,263,558 A | * | 11/1993 | Yamaoka | 188/267 |
| 5,267,462 A | * | 12/1993 | Pijanowske | 72/392 |
| 5,751,076 A | * | 5/1998 | Zhou | 310/12 |
| 6,084,319 A | * | 7/2000 | Kamata et al. | 310/12 |

FOREIGN PATENT DOCUMENTS

| DE | 41 34 730 A1 | 4/1992 |
| DE | G 91 07 176.6 UR | 11/1992 |
| DE | 196 04 643 A1 | 8/1997 |
| EP | 0 531 267 A2 | 3/1993 |
| JP | 01174260 | 7/1989 |
| WO | WO 95/03904 | 2/1995 |

* cited by examiner

*Primary Examiner*—Nestor Ramirez
*Assistant Examiner*—Judson H. Jones
(74) *Attorney, Agent, or Firm*—Venable; George H. Spencer; Ashley J. Wells

(57) ABSTRACT

The invention relates to a hoisting drive comprising several linear motors, as well as to a linear slide track with a carriage. All primary parts and all secondary parts of the linear motors are mounted on the carriage. The hoisting drive comprises a closed housing which is cooled by a coolant and into which the linear slide track is integrated together with the linear motors. Those primary parts and secondary parts which are not mounted on the carriage are mounted on the housing. A cylindrical hoisting rod is introduced into the housing in a sealed manner and mechanically joined to the carriage. This hoisting drive is especially suitable for use in the iron and steel industry as replacement for large cylinders.

23 Claims, 6 Drawing Sheets

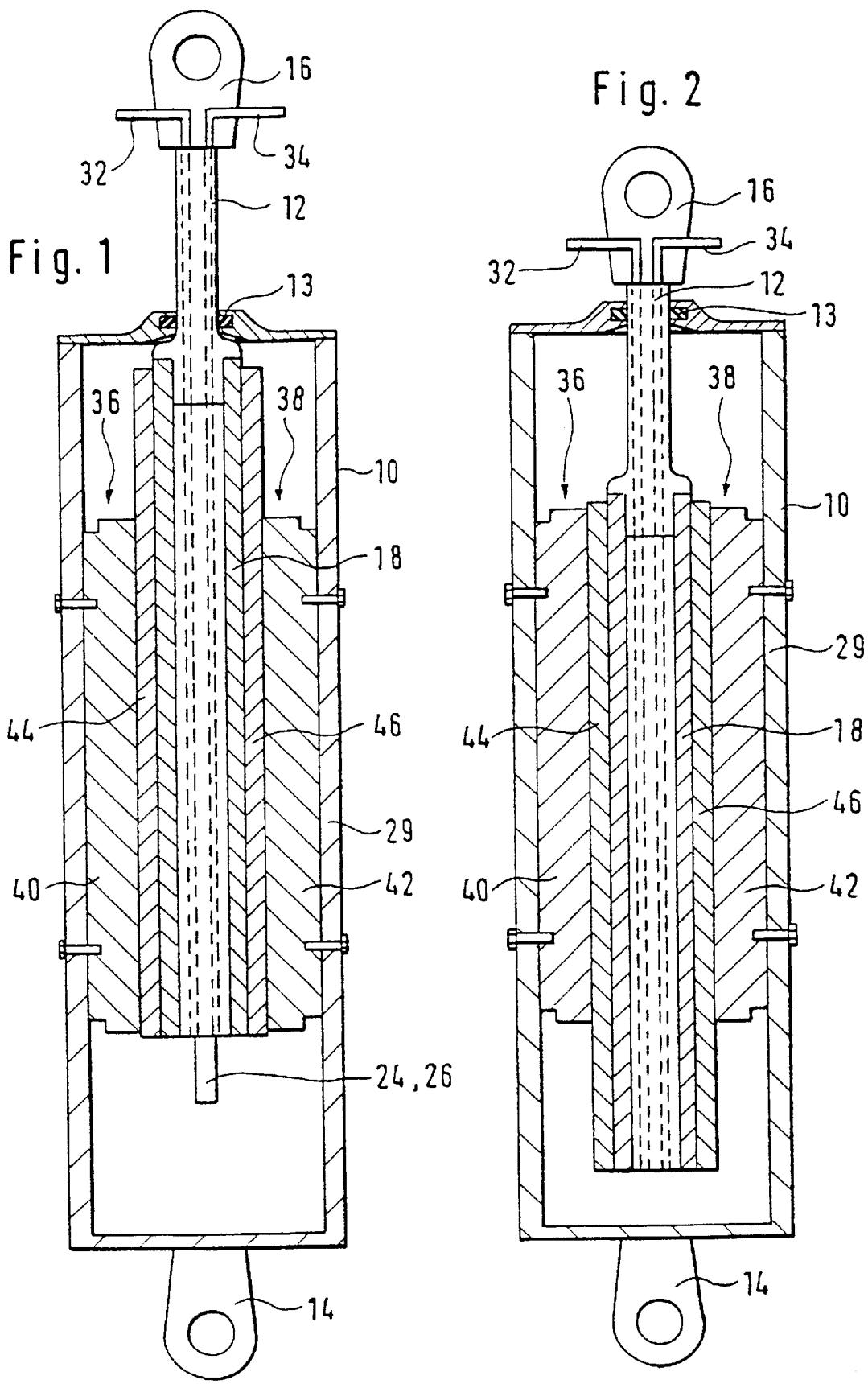

HOISTING DRIVE FOR USE IN THE IRON AND STEEL INDUSTRY

BACKGROUND OF THE INVENTION

1. Field of the Invention

The invention relates to a hoisting drive for use in the iron and steel industry.

2. Description of the Related Art

Hitherto heavy hydraulic cylinders have been used as hoisting drives in the iron and steel industry, e.g. in vibrating devices of continuous casting moulds or plug control devices in a continuous casting plant.

The use of hydraulic drive units in the hot area is not a negligible risk, however, because of flammable hydraulic fluids. Hence for some time efforts have been made to replace the hydraulic drive units in the hot area by electrical systems. Hitherto servo motors with spindle drives have been used, wherein a rotary movement is converted into a linear movement. However, limits are imposed on these drive systems by the masses to be accelerated, the system-induced vibrations and the resulting mechanical wear in the drive spindle.

When selecting a drive system it must also be taken into account that the drive must operate satisfactorily in an environment exposed to high temperatures and large quantities of dust.

The task underlying the invention is accordingly to propose an electrical hoisting drive for use in the iron and steel industry as replacement for large hydraulic cylinders.

SUMMARY OF THE INVENTION

According to the invention this problem is solved by a hoisting drive according to claim 1. A hoisting drive in accordance with the invention comprises at least one electrical linear motor and a linear guide with a carriage. Each linear motor consists of a primary part and a secondary part. All the primary parts, respectively all secondary parts, of the linear motor are mounted on the carriage. According to the invention the linear motors are integrated with the linear guide in a closed housing cooled by a cooling medium. The primary parts, respectively the secondary parts, which are not mounted on the carriage are mounted on the housing. A cylindrical hoisting rod is introduced in a sealed manner into the housing and connected mechanically to the carriage. It should be noted in this respect that electric linear motors are—because of their design and properties—by no means suitable for use in an environment exposed to dust and heat. Only the arrangement according to the invention will make them a suitable drive meeting the requirements for applications in the iron and steel industry. The hoisting drive according to the invention is extremely compact, unaffected by environmental factors such as heat, dust and sprayed water. It permits rapid and accurate positioning. It is extremely rugged in use, tolerates non-axial loads and does not have a sensitive mechanism, which could give rise to faults.

In a preferred embodiment the linear guide has at least one plane of symmetry, which contains the central axis of the hoisting rod. The linear motors are then arranged in pairs symmetrically with this plane of symmetry. As a result of the symmetrical arrangement of the linear motors, the forces are transmitted free of any force moment to the hoisting rod. Consequently symmetrical loading of the linear guide is ensured.

The housing advantageously has a jacket with cooling ducts, which can be connected to a cooling circuit. Such cooling ducts can be designed, for example, as bore holes in the housing jacket, preferably in the longitudinal direction of the housing. A coolant, e.g. water, flows through these cooling ducts, which cool the housing and the secondary and primary parts mounted on the housing when they are under load. Alternatively the housing can also be of double-walled construction, whereby the space between the walls can be connected to a cooling circuit.

In a further advantageous embodiment the hoisting rod has at least one duct, which can be connected to a cooling circuit. These cooling ducts through the hoisting rod allow to cool the carriage and the primary parts, respectively secondary parts, of the linear motors under load, which are mounted on the carriage.

In addition a position measuring system for the carriage can be integrated in the housing. A measuring device of this type comprises, for example, a measuring sensor mounted on the carriage. The position of the carriage and consequently also the position of the hoisting rod connected mechanically to the carriage is thus known at any time.

The position measuring system can be incorporated in a position control circuit. In this case the position control circuit consists of the position measuring system, a controller and a controllable electrical power supply system. The position of the cylindrical hoisting rod is determined via the position measuring system at specific times. The measured position value is transmitted to the controller, which compares the measured value with a predetermined set value. The controller forms the differential value from the two values. Depending on the calculated differential value the controller activates the controllable electrical power supply. The latter changes the power supply of the primary parts of the linear motors.

The hoisting drive according to the invention is used e.g. advantageously in the iron and steel industry for vibration of a continuous casting mould, as described e.g. in WO 95/03904.

Furthermore, a device of this type is suitable as an actuator drive for control of the inflow of liquid steel in continuous casting plants. These inflow control systems control the level in the distributor channel or the continuous casting mould. The actuator drive can be used both for position control of a ceramic plug in bottom-tap casting, and also for slide control systems.

BRIEF DESCRIPTION OF THE

An embodiment of the invention will now be described below with reference to the accompanying drawings, in which:

FIG. 1: is longitudinal section through a first embodiment of an electrical hoisting drive, in a first position;

FIG. 2 is a longitudinal cross-section through the hoisting drive in FIG. 1, in a second position;

FIG 3: is a cross-section through the electrical hoisting drive in FIG. 1 and FIG. 2;

FIG. 4: is a longitudinal section through a second embodiment of an electrical hoisting drive, in a first position;

DESCRIPTION OF THE PREFERRED EMBODIMENTS

Figure 3:
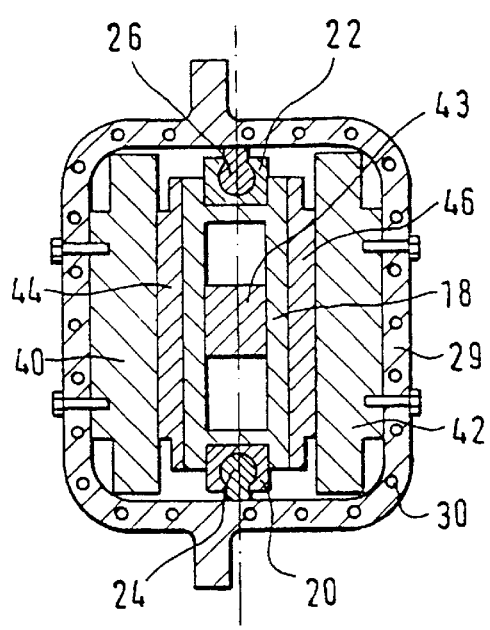

FIGS. 1 to 6 show electrical hoisting drives which have been specially is developed to replace heavy hydraulic cylinders in the iron and steel industry.

Like a hydraulic cylinder, the hoisting drive 114 shown in the figures comprises a housing 10 and a cylindrical hoisting rod 12 led out of the housing 10. Sealing elements 13 seal the axially movable hoisting rod 12 from the housing 10. A swivelling bearing 14 or 16 is provided both on the housing 10 and also on the hoisting rod 12. The housing 10 serves as a protective sleeve in an iron and steel works environment exposed to dust and heat. Inside the housing 10 the hoisting rod 12 is connected to a type of slide 18 (see also FIGS. 3 and 6). This carriage 18 comprises two guide bearings 20, 22 opposite each other, which are guided in guide rails 24, 26. The latter are mounted on the housing 10. Guide bearings 20, 22 and guide rails 24, 26 form a rugged linear guide for the carriage 18 in the housing 10. The section line of a plane which runs through the two longitudinal axes of the guides 20, 24 and 22, 26 is designated 28 in FIG. 3. This guide plane 28 likewise includes the longitudinal axis of the hoisting rod 12.

Figure 6:
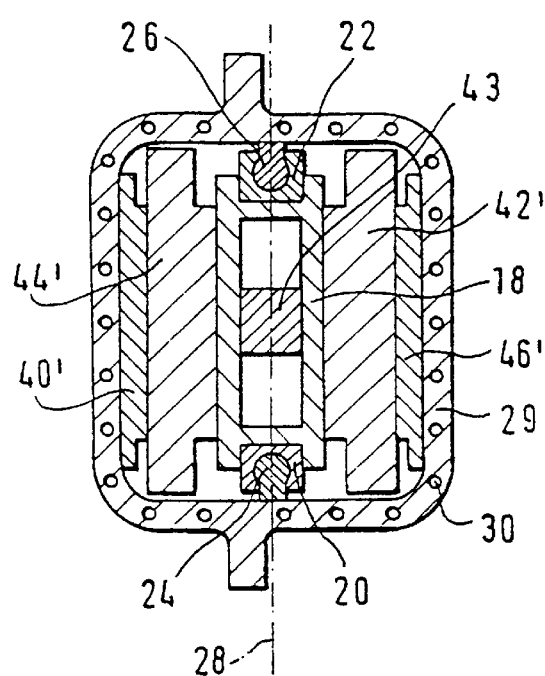
FIG. 6 is a cross-section through the electrical hoisting drive in FIG. 4 and FIG.5.

As shown in FIGS. 3 and 6, the housing 10 has bore holes in the longitudinal direction in the housing jacket 29. These holes are connected to a cooling circuit and used as housing cooling ducts. Alternatively the housing could also be of double-walled construction, a cooling liquid flowing through the interspace. As shown schematically in FIGS. 1 and 2, the carriage 18 can likewise be cooled by a cooling liquid via ducts 32, 34 in the hoisting rod 12.

According to the invention the hoisting drive has electrical linear motors 36, 38, 36', 38' as a drive source. The latter are arranged symmetrically with the plane 28 in housing 10. The motors are preferably synchronous linear motors, which comprise a primary part supplied with power and a secondary part consisting of permanent magnets. However, the secondary part could likewise comprise electromagnets. The primary part can be laminated or consist of air-core coils.

Figure 4:
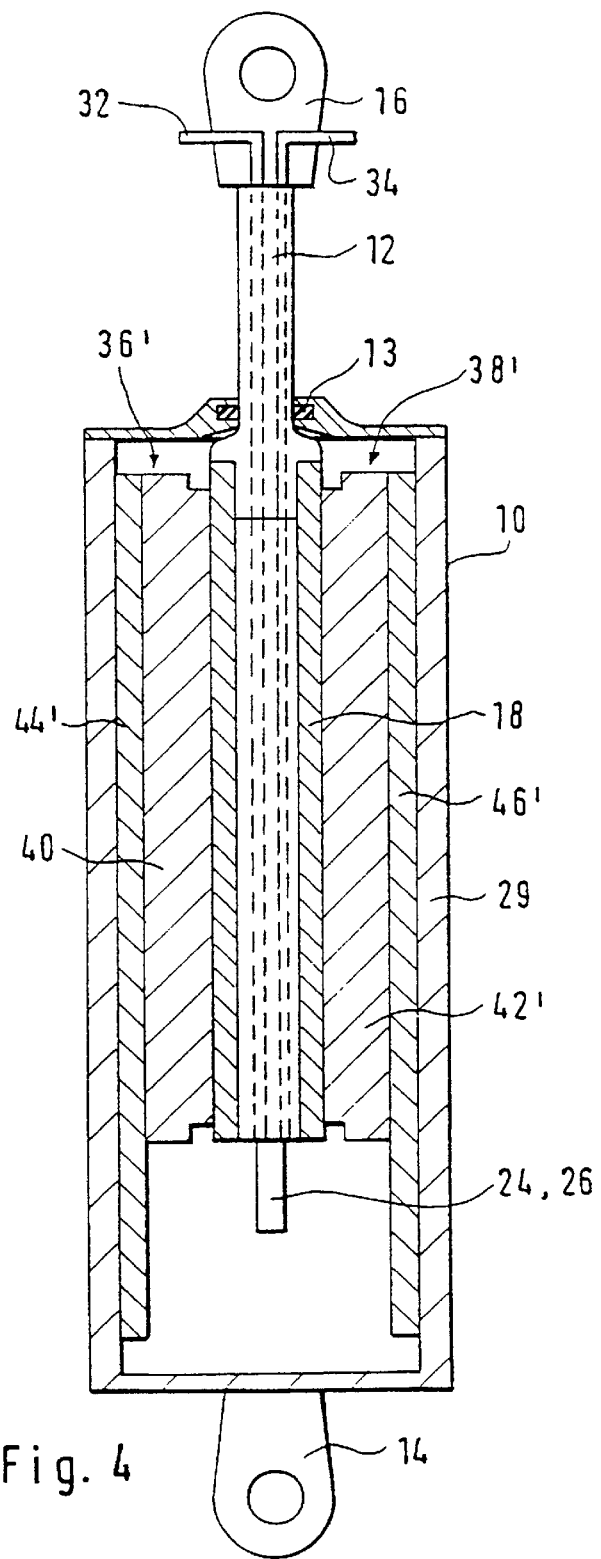
Figure 5:
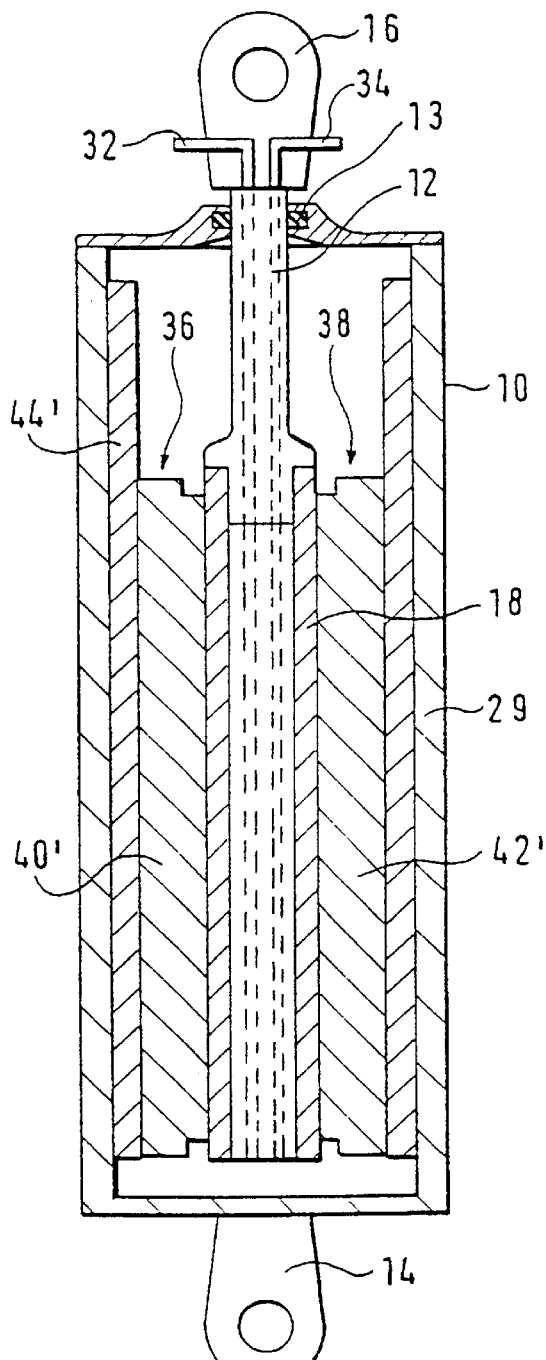
FIG. 5 is a longitudinal section through the hoisting drive in FIG. 4, in a second position.

In FIGS. 1 to 3 the primary part 40, 42 of the linear motors 36, 38 is securely connected to the housing 10, and the secondary part 44, 46 is arranged on the carriage 18. In FIGS. 4 to 6 the secondary part 44', 46' of the linear motors 36', 38' is securely connected to the housing 10, and the primary part 40', 42' is arranged on the carriage 18. The embodiment according to FIGS. 1 to 3 should be preferred in most cases, because the substantially heavier primary part 40, 42 can be mounted far more easily on the housing than on the carriage and can also be cooled far more easily here. The lighter secondary part 44, 46 is mounted on the carriage 18 for acceleration reasons. However, it should be stated that the embodiment according to FIGS. 4 to 6 permits a shorter overall length. With this embodiment the primary parts on the carriage are advantageously supplied with power via a duct (not shown) through the hoisting rod 12.

A position measuring system 43 (shown in FIG. 3 and FIG. 6) is also advantageously installed in the housing 10 to determine the position of the carriage 18 at any time.

The position measuring system 43 can then be incorporated in a position control circuit 120 (shown in FIG. 8), so that the drive stroke is adjusted. In this case the position control circuit 120 consists of the position measuring system 43, a controller 122 and a controllable electrical power supply 124. The position of the cylindrical hoisting rod 12 is then determined continuously via the position measuring system 43. The measured position value is transmitted to the controller 122, which compares the measured value with a predetermined required value 126. The controller 122 forms the differential value from the two values. Depending on the calculated differential value the controller 122 activates the controllable electrical power supply 124. The latter changes the power supply to the primary parts of the linear motors.

Figure 7:
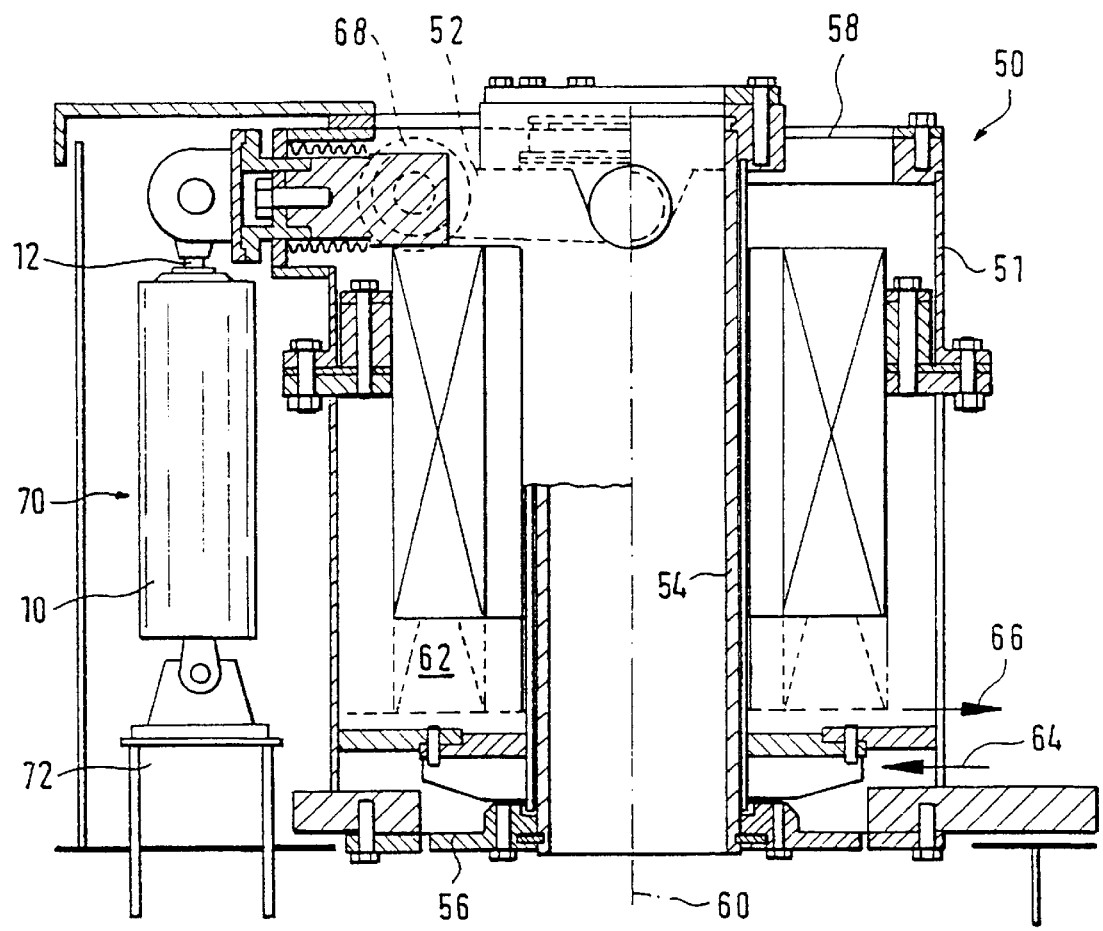
FIG. 7 is a section through a continuous casting mould with a vibrating device with an electrical hoisting drive.

In the iron and steel industry the hoisting drives described above can be used, for example, in a vibrating device of a continuous casting mould. A continuous casting mould with an integrated vibrating device is described, for example, in WO 95/03904. A continuous casting mould of this type is shown in FIG. 7 and designated 50. It comprises a fixed housing 51 with an integrated rocker lever 52. A casting tube 54 is mounted on the rocker lever 52 in this mould 50. This casting tube is connected to the outer fixed housing 51 via two elastically deformable annular sealing diaphragms 56, 58 in such a way that it can vibrate along the casting axis 60 in the housing 51. The annular sealing diaphragms 56, 58 seal an annular pressure chamber 62 for a cooling liquid around the casting tube (see arrows 64, 66, which represent the feed and discharge of the cooling liquid symbolically). The rocker lever 52 is mounted on pivot bearings 68 in the housing 51 in such a way that it can be swivelled about a horizontal axis. A hoisting drive according to the invention is designated 70. Its hoisting rod 12 is pivoted on the rocker lever 52 and its housing 10 on a fixed point 72. The hoisting drive 70 according to the invention produces controllable vibrations with a frequency of several Hz and an amplitude in the millimetre range, which are transmitted via the rocker lever 52 to the casting tube 54.

Figure 8:
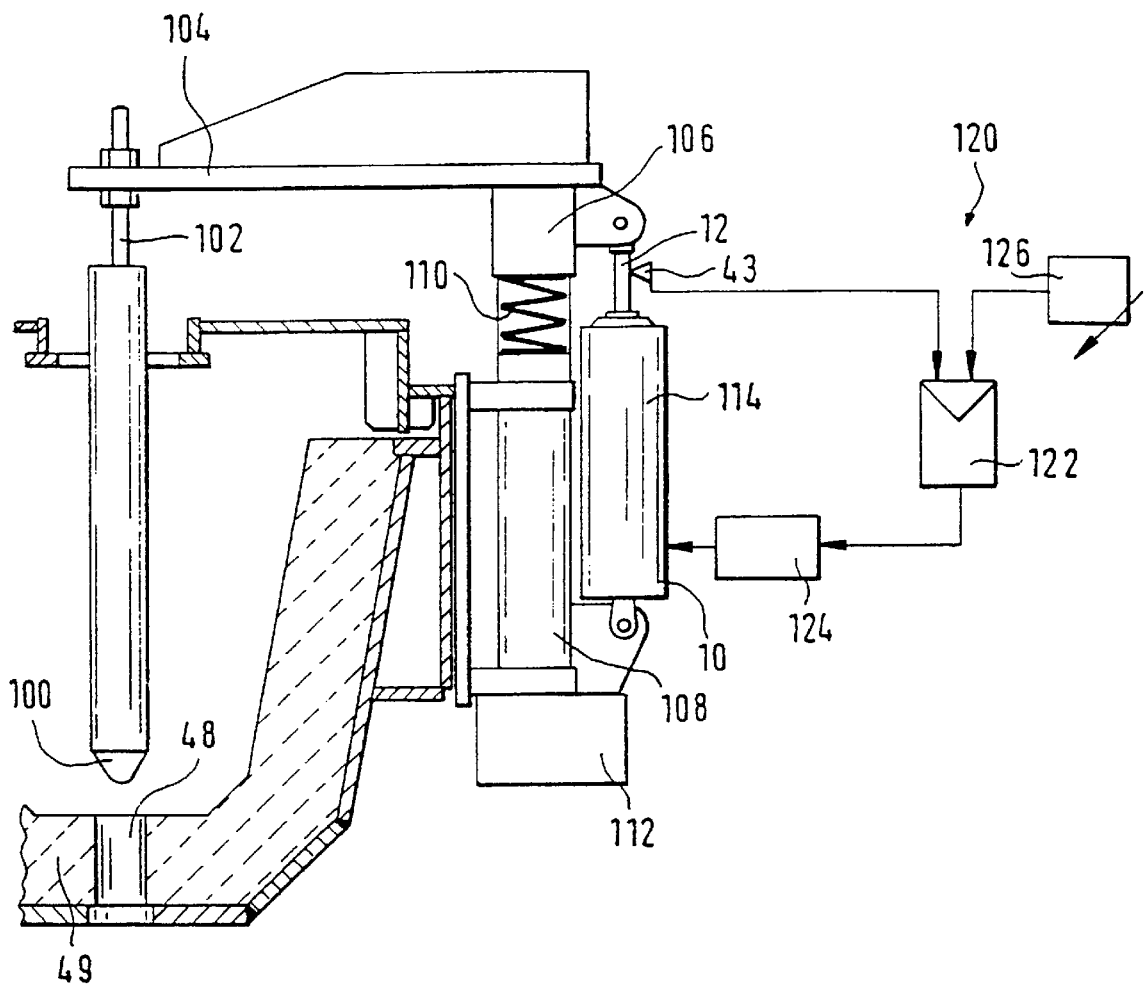
FIG. 8 is a view of a device for control of the flow in a casting opening of a metallurgical vessel with a schematic representation of a control circuit.

As shown in FIG. 8, hoisting drives of this type can also be used, for example, for control of the position of a movable plug 100 in the tundish of a continuous casting plant. The ceramic plug 100 controls the flow of liquid steel in a casting opening 48, which is located in the bottom 49 of the tundish above a continuous casting mould (not shown). The tapered plug 100 is secured to a rod 102, which is connected mechanically via an arm 104 to a vertically movable guide head 106. The guide head 106 is guided in a vertical column 108 and rests on a spring system 110, which partially absorbs the weight of the arm 104 with the guide head 106. The column 108 is mounted on a supporting base 112. A hoisting drive 114 according to the invention is secured between the guide head 106 and the supporting base 112. Its hoisting rod 12 is pivoted on the guide head 106 and its housing 10 on the supporting base 112. The guide head 106 is moved via the hoisting rod 12 of the hoisting drive 114 along the supporting base 112 by activation of the hoisting drive 114. The vertical movement of the guide head 106 is transmitted via the arm 104 to the rod 102, which is securely connected to the plug 100.

Figure 9:
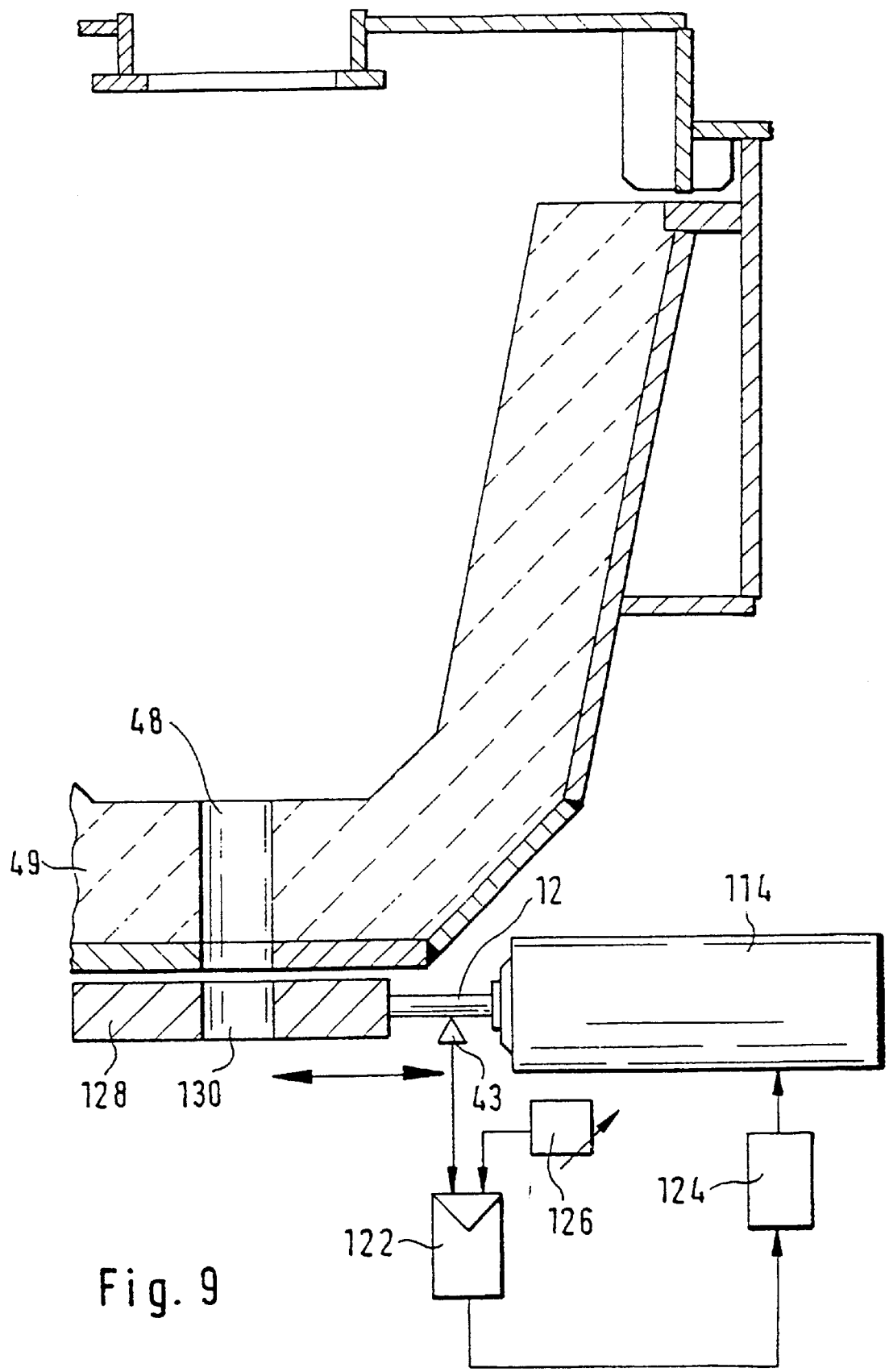
FIG. 9 is a view of a further device for control of the flow in a casting opening of a metallurgical vessel by means of a slide.

Furthermore, a hoisting drive according to the invention is suitable for control of the flow of liquid steel to continuous casting plants by slide control systems (FIG. 9).

A horizontally movable slide 128 controls the flow of liquid steel in the casting opening 48. The slide 128 comprises an opening 130, with e.g. the same diameter as the casting opening 48. The slide 128 is securely connected to the hoisting rod 12 of the hoisting drive 114.

What is claimed is:

1. A hoisting drive as a replacement for heavy hydraulic cylinders in plants exposed to dust and heat in the iron and steel industry, comprising:

at least one electrical linear motor, each linear motor consisting of a primary part and a secondary part; and a rugged linear guide with a carriage guided in guide rails, wherein all primary parts or all secondary parts of the linear motors are mounted on the carriage;

a closed housing, with a housing jacket through which a cooling medium flows, into which the linear guide with the linear motors is integrated, the primary parts and the secondary parts which are not mounted on the carriage being mounted on the housing; and a cylindrical hoisting rod, which is introduced in a sealed manner into the housing and is connected mechanically to the carriage.

2. The hoisting drive according to claim 1, wherein:

the linear guide has at least one symmetrical plane, which contains the central axis of the hoisting rod; and the linear motors are arranged in pairs symmetrically with said plane of symmetry.

3. The hoisting drive according to claim 1, wherein the housing includes cooling ducts to be connected to a cooling circuit.

4. The hoisting drive according to claim 1, wherein the housing includes a double wall with an interspace to be connected to a cooling circuit.

5. The hoisting drive according to claim 1, comprising a position measuring system for the carriage.

6. The hoisting drive according to claim 5, comprising a position control circuit, which incorporates the position measuring system.

7. A continuous casting mould comprising a hoisting drive for vibrating said mould, said hoisting drive comprising:

at least one electrical linear motor, each linear motor consisting of a primary part and a secondary part; and a rugged linear guide with a carriage guided in guide rails, wherein all primary parts or all secondary parts of the linear motors are mounted on the carriage;

a closed housing, with a housing jacket through which a cooling medium flows, into which the linear guide with the linear motors is integrated, the primary parts and the secondary parts which are not mounted on the carriage being mounted on the housing; and a cylindrical hoisting rod, which is introduced in a sealed manner into the housing and is connected mechanically to the carriage.

8. The continuous casting mould according to claim 7, comprising a position measuring system for the carriage.

9. The continuous casting mould according to claim 8, comprising a position control circuit, which incorporates the position measuring system.

10. The hoisting drive according to claim 7, wherein:

the linear guide has at least one symmetrical plane, which contains the central axis of the hoisting rod; and the linear motors are arranged in pairs symmetrically with said plane of symmetry.

11. The hoisting drive according to claim 7, wherein the housing includes cooling ducts to be connected to a cooling circuit.

12. The hoisting drive according to claim 7, wherein the housing includes a double wall with an interspace to be connected to a cooling circuit.

13. A casting tundish comprising:

a casting opening;

a movable plug associated with said casting opening for controlling the flow of liquid steel through said casting opening; and a hoisting drive for actuating said plug, wherein said hoisting drive comprises:

at least one electrical linear motor, each linear motor consisting of a primary part and a secondary part; and a rugged linear guide with a carriage guided in guide rails, wherein all primary parts or all secondary parts of the linear motors are mounted on the carriage:

a closed housing, with a housing jacket through which a cooling medium flows, into which the linear guide with the linear motors is integrated, the primary parts and the secondary which are not mounted on the carriage being mounted on the housing; and a cylindrical hoisting rod, which is introduced in a sealed manner into the housing is connected mechanically to the carriage.

14. The hoisting drive according to claim 13, wherein:

the linear guide has at least one symmetrical plane, which contains the central axis of the hoisting rod; and the linear motors are arranged in pairs symmetrically with said plane of symmetry.

15. The hoisting drive according to claim 13, wherein the housing includes cooling ducts to be connected to a cooling circuit.

16. The hoisting drive according to claim 13, wherein the housing includes a double wall with an interspace to be connected to a cooling circuit.

17. The hoisting drive according to claim 13, comprising a position measuring system for the carriage.

18. The hoisting drive according to claim 17, comprising a position control circuit, which incorporates the position measuring system.

19. A casting tundish comprising:

a casting opening;

a movable slide associated with said casting opening for controlling the flow of liquid steel through said casting opening; and a hoisting drive for actuating said carriage, wherein said hoisting drive comprises:

at least one electrical linear motor, each linear motor consisting of a primary part and a secondary part; and a rugged linear guide with a carriage guided in guide rails, where all primary parts or all secondary parts of the linear motors are mounted on the carriage;

a closed housing, with a housing jacket through which a cooling medium flows, into which the linear guide with the linear motors is integrated, the primary parts and the secondary parts which are not mounted on the carriage being mounted on the housing; and a cylindrical hoisting rod, which is introduced in a sealed manner into the housing and is connected mechanically to the carriage.

20. A hoisting drive as a replacement for heavy hydraulic cylinders in plants exposed to dust and heat in the iron and steel industry, comprising:

at least one electrical linear motor, each linear motor consisting of a primary part and a secondary part; and a rugged linear guide with a carriage guided in guide rails, wherein all primary parts or all secondary parts of the linear motors are mounted on the carriage;

a closed housing, with a housing jacket through which a cooling medium flows, into which the linear guide with the linear motors is integrated, the primary parts and the secondary parts which are not mounted on the carriage being mounted on the housing; and a cylindrical hoisting rod, which is introduced in a sealed manner into the housing and is connected mechanically to the carriage, and which has at least one duct to be connected to a cooling circuit.

21. The hoisting drive according to claim 20, wherein:

the linear guide has at least one symmetrical plane, which contains the central axis of the hoisting rod; and the linear motors are arranged in pairs symmetrically with said plane of symmetry.

22. The hoisting drive according to claim 20, wherein the housing includes cooling ducts to be connected to a cooling circuit.

23. The hoisting drive according to claim 20, wherein the housing includes a double wall with an interspace to be connected to a cooling circuit.

* * * * *